United States Patent [19]

Todreas et al.

[11] Patent Number: 5,442,668

[45] Date of Patent: Aug. 15, 1995

[54] PASSIVE PRESSURE TUBE LIGHT WATER COOLED AND MODERATED REACTOR

[75] Inventors: Neil E. Todreas, Waban; Michael J. Driscoll, Cambridge; Pavel Hejzlar, Arlington, all of Mass.; Jan R. Tang, Taipei, Taiwan

[73] Assignee: Massachusetts Institute of Technology, Cambridge, Mass.

[21] Appl. No.: 71,738

[22] Filed: Jun. 3, 1993

[51] Int. Cl.[6] ............................................. G21C 15/00
[52] U.S. Cl. .................................. 376/367; 376/371
[58] Field of Search ............... 376/367, 366, 267, 371, 376/904, 411, 282, 304; 165/32

[56] References Cited

U.S. PATENT DOCUMENTS

| | | | |
|---|---|---|---|
| 3,620,916 | 11/1971 | Hilborn | 376/265 |
| 3,672,443 | 6/1972 | Bienert et al. | 165/32 |
| 3,854,524 | 12/1974 | Gregorie et al. | 165/32 |
| 4,046,627 | 9/1977 | Middleton | 376/282 |
| 4,123,328 | 10/1978 | Radkowski et al. | 376/350 |
| 4,911,880 | 3/1990 | Kasai et al. | 376/371 |
| 4,998,509 | 3/1991 | Gou et al. | 122/504 |
| 5,171,521 | 12/1992 | Moyer | 376/436 |

Primary Examiner—Donald P. Walsh
Assistant Examiner—Meena Chelliah
Attorney, Agent, or Firm—Karl F. Milde, Jr.

[57] ABSTRACT

A nuclear reactor has a containment vessel and a voided calandria space having a plurality of fuel channels therein. A chamber surrounding the calandria space is receptive of a light water moderator and a solid reflector in the chamber surrounds the calandria space. Each fuel channel has a solid fuel matrix having a plurality of coolant holes extending longitudinally therethrough and receptive of light water coolant, a pressure tube surrounding the fuel matrix and a calandria tube surrounding the pressure tube and forming a gap therebetween.

17 Claims, 8 Drawing Sheets

PASSIVE PRESSURE TUBE LIGHT WATER COOLED AND MODERATED REACTOR

BACKGROUND OF THE INVENTION

The present invention relates to passive decay heat removal in a pressure tube light water cooled and moderated reactor with a large power rating on the order of 1,000 MWe.

A large amount of decay energy is continually generated by nuclear fuel after the reactor is shut down. Conventionally, actively pumped redundant cooling systems provide the emergency coolant to remove this decay heat under abnormal conditions such as a loss of coolant accident.

Conventional reactors have the additional disadvantage that their power density profile has a maximum average power ratio or peaking factor of about, 2, even when measures are employed to minimize this peaking.

SUMMARY OF THE INVENTION

One object of the present invention is to insure that the fuel remains undamaged and within safety limits even in the total absence of coolant in the primary system of the reactor.

Another object of the present invention is to provide a heat path to ambient air which is provided by natural heat transfer mechanisms such as, conduction, radiation and free convection and which eliminates the reliance on the availability of pumped cooling.

A further object of the present invention is to considerably flatten the power density profile of the reactor across the core to increase safety margins or increase power rating.

These and other features of the present invention are achieved in accordance with the present invention in one embodiment wherein a wet calandria design utilizes a fuel matrix in a pressure tube with light water as the coolant, the calandria is surrounded by a solid reflector having a mixture of a light water moderator and a void or graphite in the calandria space and arranged such that the light water moderator is always in contact with the calandria tube and provides a heat sink, and the optional use of a thermal switch in the gap between the pressure tube and the calandria tube which provides thermal insulation during normal operation to minimize heat loss and enhance heat transport across the gap during accidents.

In accordance with another embodiment of the present invention wherein a dry calandria is utilized, the present invention is carried out utilizing a fuel matrix in a pressure tube with light water as the coolant, a dry calandria surrounded by a solid reflector connected by passages to a light water pool kept outside the calandria via a gas lock and self-actuated means which initiates calandria flooding by releasing the gas pressure within the calandria space during accidents which could lead to temperatures exceeding the safety limits.

As a result of the above-mentioned features of the present invention, both the wet calandria and the dry calandria embodiments can survive the loss of coolant in an accident without a scram and without replenishing primary coolant, there is a super flat power density profile which considerably increases safety margins or allows operation at higher power ratings, very tight neutronic core coupling is achieved which allows for reactor control to be performed from outside the core and eliminating the possibility of local criticality and giving absolute stability towards xenon spatial oscillations, long prompt neutron lifetime in comparison with conventional light water reactors which reduces potential concerns with prompt reactivity excursions and negative coolant void coefficient is attained. With respect to the dry calandria embodiment, other advantages include the fact that it can operate in post-critical heat flux without exceeding safe fuel and matrix temperature limits and has one additional barrier in the silicon carbide matrix coating to fission product release.

While all of the above-mentioned embodiments utilize water as a coolant, the wet calandria design can also be adapted to use gas coolants and both versions can employ organic coolants.

These and other features and advantages of the present invention will be seen from the following detailed description of the invention taken with the attached drawings, wherein:

DETAILED DESCRIPTION OF THE INVENTION

Figure 1:
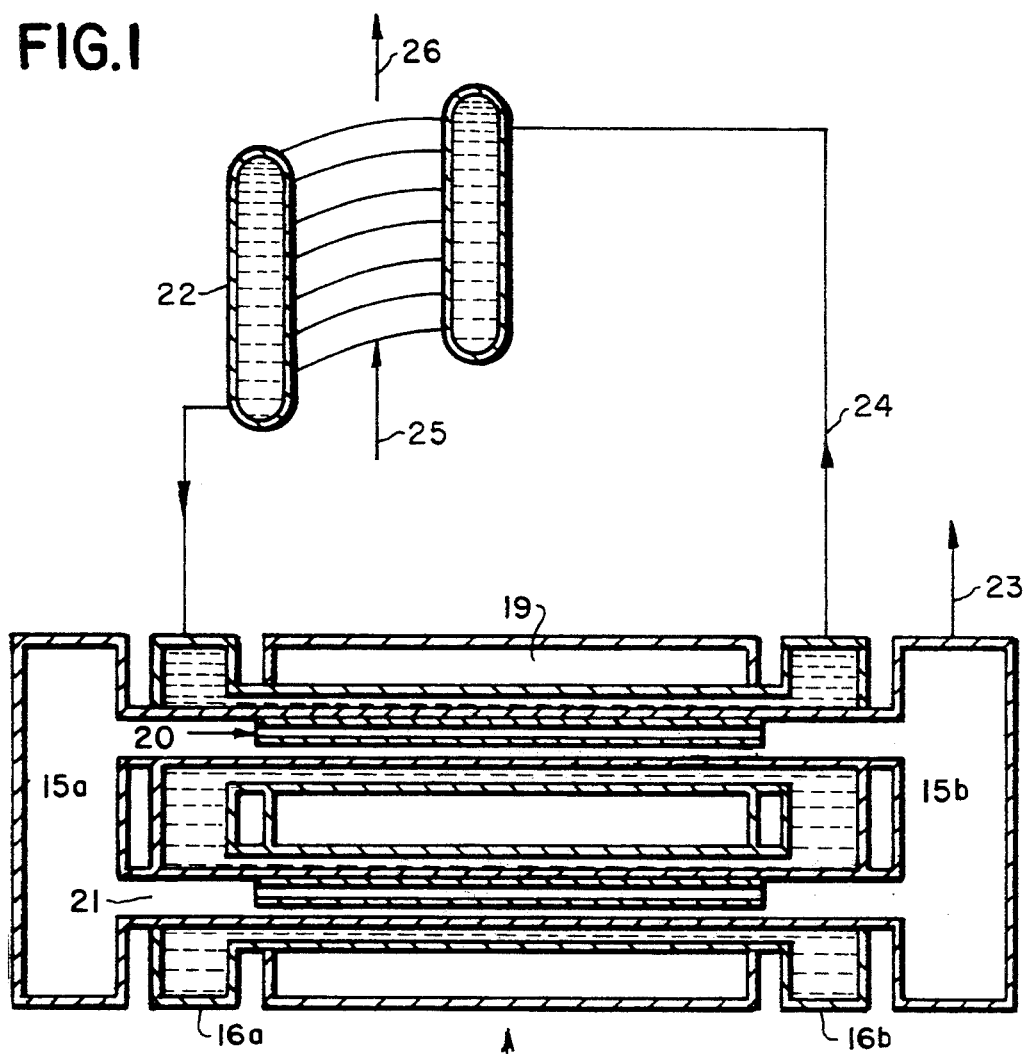
FIG. 1 is a schematic of the heat flow path for passive decay heat removal in a wet calandria type reactor according to the present invention.

Referring now to FIGS. 1-4, one embodiment of a passive light water cooled and moderated pressure tube wet calandria type reactor 10 is shown. The reactor has an air baffle 11 surrounding a steel containment vessel 12 which defines an air path therebetween where air 18 enters from the environment and passes by the inlet and outlet plena of modular air heat exchangers 13 which have tilted horizontal water fin tubes 14 cooled by air.

The reactor also has the primary inlet/outlet header 15 and the moderator inlet/outlet plenum 16 situated in moderator light water 17.

The heat flow path for the reactor is shown in FIG. 1, wherein calandria tank 19 has the primary system inlet header 15a, a primary system outlet header 15b, moderator inlet plena 16a and a moderator outlet plena 16b. Between the primary system headers are pressure tubes 21 each having a fuel matrix 20 therein.

High pressure and temperature primary cooling fluid is outlet at 23 from the primary system outlet headers 15b and low pressure and temperature moderator recirculating fluid passes through line 24 through heat exchanger 22 and back into primary system inlet header 16a. The heat exchanger 22 has a secondary fluid inlet 25 for ambient air and a secondary fluid outlet 26.

In accordance with the invention, decay energy is stored in the fuel matrix through temperature redistribution. Heat is transported through the pressure/calandria tubes to the moderator system by conduction and radiation. The light water moderator absorbs the decay heat and circulates by natural circulation to provide an intermediate heat sink. The moderator is cooled within an air chimney which communicates with the ultimate heat sink, the environment.

Thus this embodiment uses light water in both the coolant and moderator regions in place of heavy water. The use of light water as the moderator also thermally couples the fuel to the ultimate heat sink, allowing consideration of a variety of passive natural circulation configurations.

Figure 2:
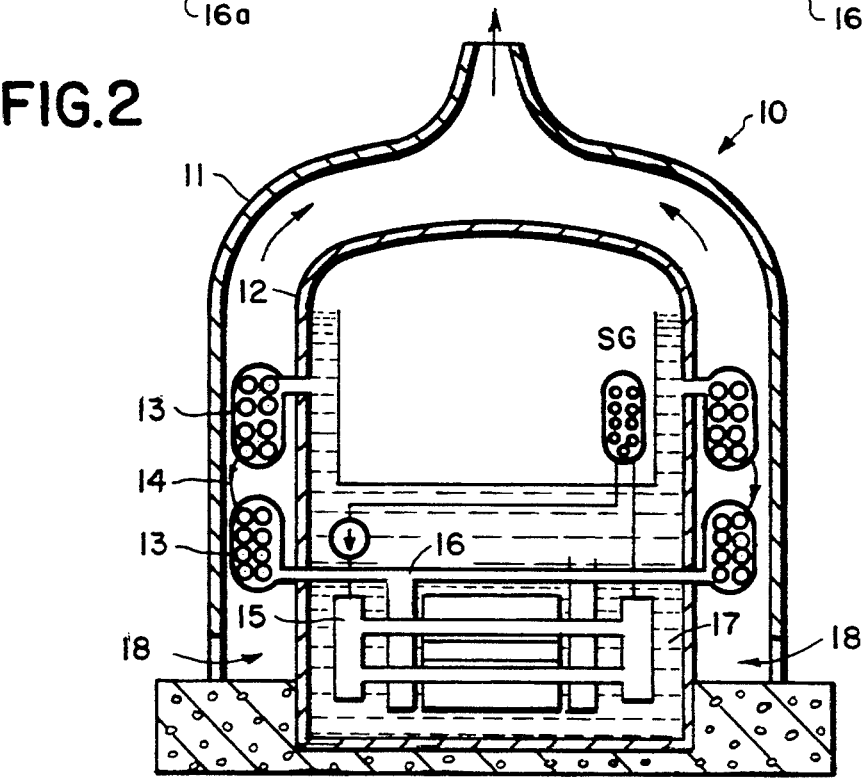
FIG. 2 is a schematic cross section of the components of the reactor of FIG. 1.

A moderator recirculating system, together with a natural draft air cooling system, are used to ultimately remove the decay heat. The modular air heat exchangers 13 around the steel containment vessel are used with an outer air baffle to create a tall air chimney as shown in FIG. 2. Single phase water in the moderator recirculating loop is directed to the moderator outlet header and then distributed 360° circumferentially to the inlet plenum of each modular air heat exchanger at elevated positions outside the steel containment vessel. The hot water is then directed from the inlet plenum to the outlet plenum through the tilted finned tubes and cooled by air and finally returned to the calandria by natural circulation. The system is always operating to remove the heat loss under normal conditions.

Figure 3:
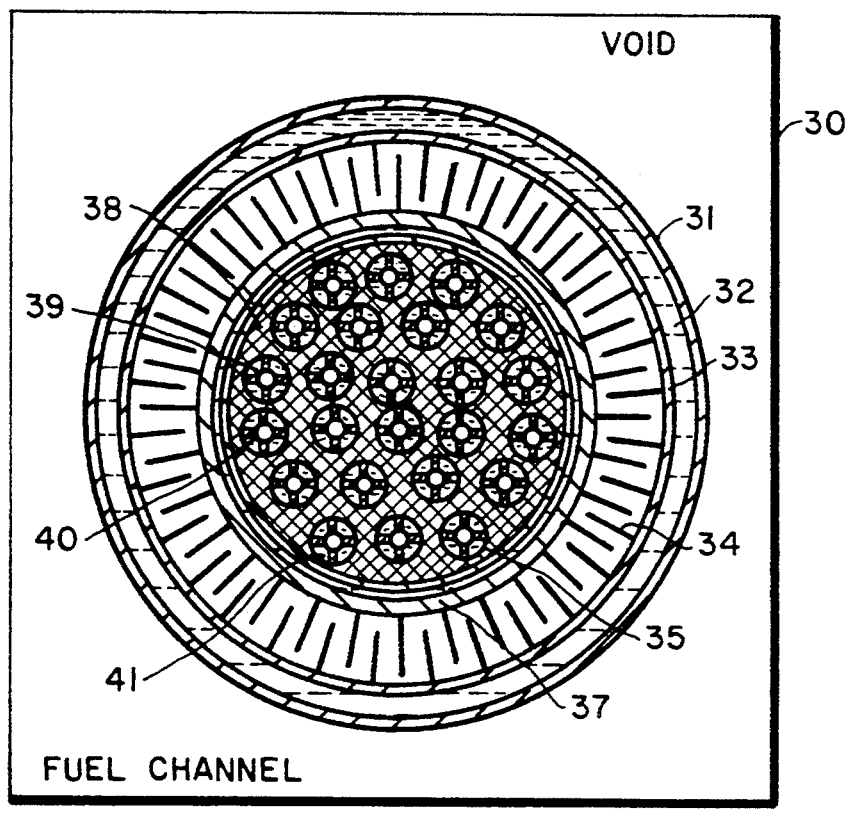
FIG. 3 is a sectional view of the fuel channel of FIGS. 1 and 2.
Figure 4:
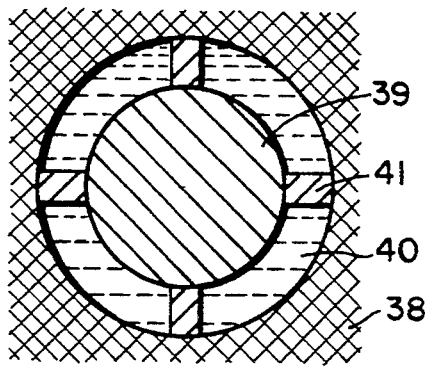
FIG. 4 is a sectional view of a fuel rod shown in FIG. 3.

FIGS. 3 and 4 show a fuel channel design according to the invention wherein a moderator water tube 31 is surrounded by void 30 and defines with calandria tube 33 a moderator water path 32. The calandria tube 33 and fuel runner 37 define a space between which axial interlocking fins 34 are disposed. Within the fuel runner 37 is a coolant gap 36 in which the fuel matrix 38 is disposed and which includes fuel rods 39 in coolant holes 40. The fuel rods 39 have contact lands 41 disposed in the coolant hole between the rods and the fuel matrix 38.

In a preferred embodiment of the present invention, the fuel matrix is composed of 24 coolant holes with fuel rods in each hole within the matrix material. The cylindrical fuel bundle in a Zr-2.5% Nb pressure tube is supported by six runners 37 around the outer surface of the bundle. Conventional Zircaloy clad fuel with two weight per cent enrichment is supported in each coolant hole by contact lands 41, which in turn provide a good conduction path between the fuel and the matrix material. Graphite, with a silicon carbide coating to prevent water permeation, is employed as the matrix material.

The interlocking fins 34 increase the thermal radiation heat transfer by increasing heat transfer area for both the pressure and calandria tubes. The axial fins are uniformly distributed peripherally and attached to the outer surface of the pressure tubes and the inner surface of the calandria tubes. An increase in temperature under accident conditions naturally enhances the radial heat transfer which in turn results in a thermal switch effect. The fin material must have good thermal conductivity such as that of an aluminum alloy. Where less conductive Zircaloy is used as the fin material, the insulating gap between the fins can be filled with an SiC coated graphite particle bed. The packed particle bed is then operated under vacuum for normal conditions and is filled with air or with steam under accident conditions to enhance the effective conductivity.

The fin annular ring 32 of moderator water replaces the heavy water moderator of conventional designs. Decay heat can be transported radially across the fuel channel from the fuel matrix to the low temperature moderator water in the annular ring to protect the fuel and pressure tube from overheating under accident conditions. The moderator water annulus allows retention of on line refueling and reduces the heat loss from direct gamma and neutron heating occurred by a heavy water pressure tube reactor.

Figure 5:
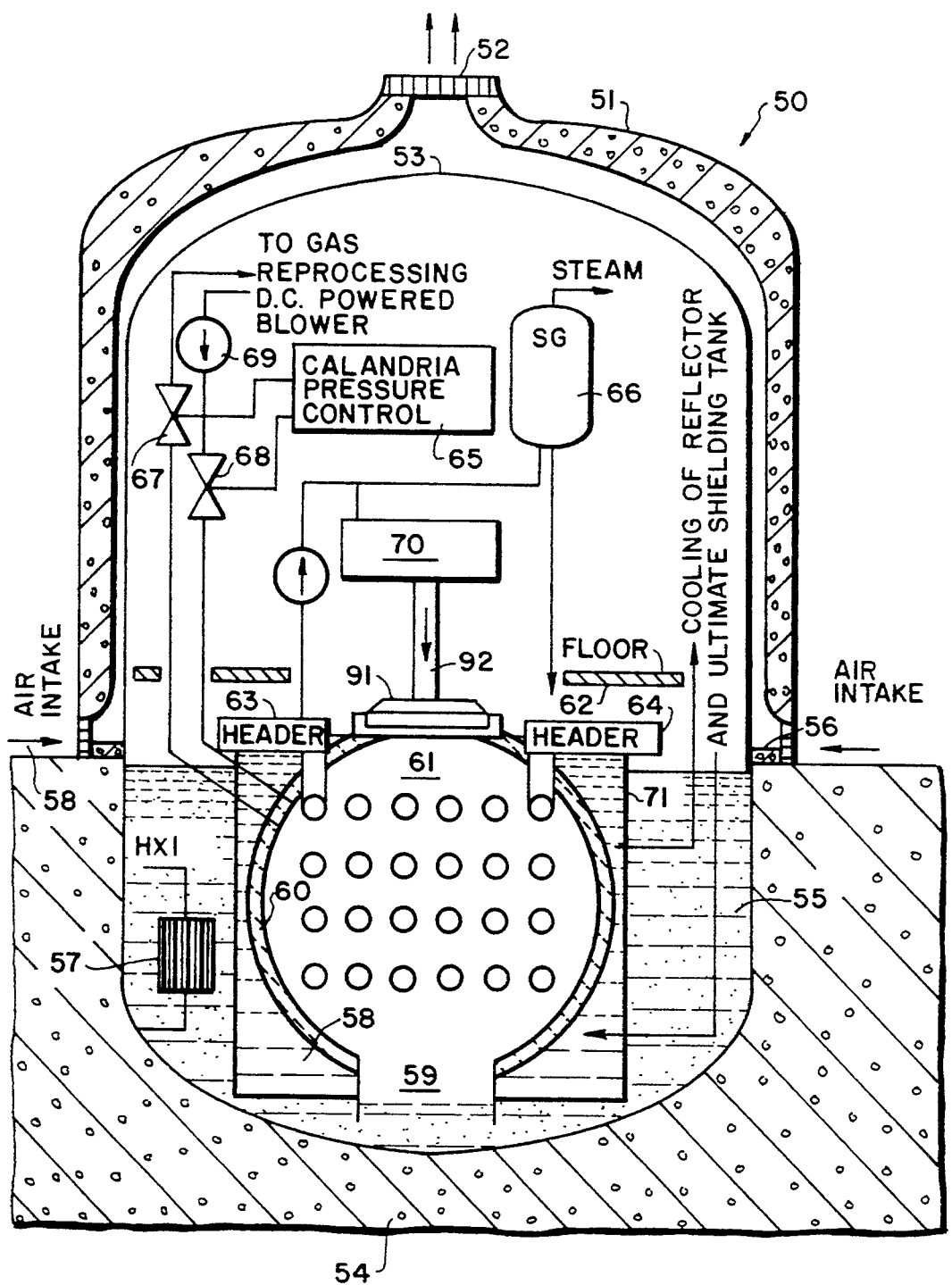
FIG. 5 is a schematic cross section of a passive pressure tube light water cooled and moderated dry calandria type reactor according to the present invention.

FIG. 5 is a schematic cross-sectional view of a passive pressure tube light water cooled and moderated dry calandria type reactor 50 according to the present invention.

As shown therein, a calandria 61 surrounded by a solid neutron reflector 60 is submerged in a tank 71 with light water 58 which serves for both cooling of the reflector and for the shielding of neutrons which escape from the reflector. The tank 71 with calandria 61 are submerged in a large amount of containment water 56 in a tank 55 embedded in concrete 54. During normal operation, containment water 56 is kept away from the calandria space by a gas lock 59. The gas pressure is maintained at such a level as to balance the water column outside the calandria. Any disturbance in the primary cooling system pressure, for example, loss of coolant or loss of heat sink, beyond a predefined envelope of safety limits, will result in the opening of fail safe passive valve 70 and the flooding of the entire calandria space by the containment water.

The flooding water has the function of storing a large amount of decay energy in the form of latent heat, thus substantially reducing the instantaneous heat rate which must be transported through containment walls in the early stages of an accident, it removes the decay heat from the reactor's pressure tubes by boiling and condensing on containment walls, it shuts down the reactor and renders it deeply subcritical by excessive neutron absorption even in a boiling mode and it considerably reduces the decay heat load on the fuel matrix by absorbing a large portion of gamma heating which would have been otherwise deposited in the fuel matrix.

The steel containment vessel 53 of reactor 50 is surrounded by a protective wall 51 made of prestressed concrete such that an annular air path is formed with an air intake 72 and an air outlet 52 at the top of the reactor.

Within the reactor and disposed above the floor 62 is the calandria pressure control 65 which controls valves 67 and 68 which in turn control the input and output of gas to the calandria space in order to maintain the gas lock 59. The primary system inlet header 64 and outlet header 63 a part of the heat exchange path to steam generator 66 and heat exchanger 57 is disposed in the containment water as in conventional systems.

Figure 6:
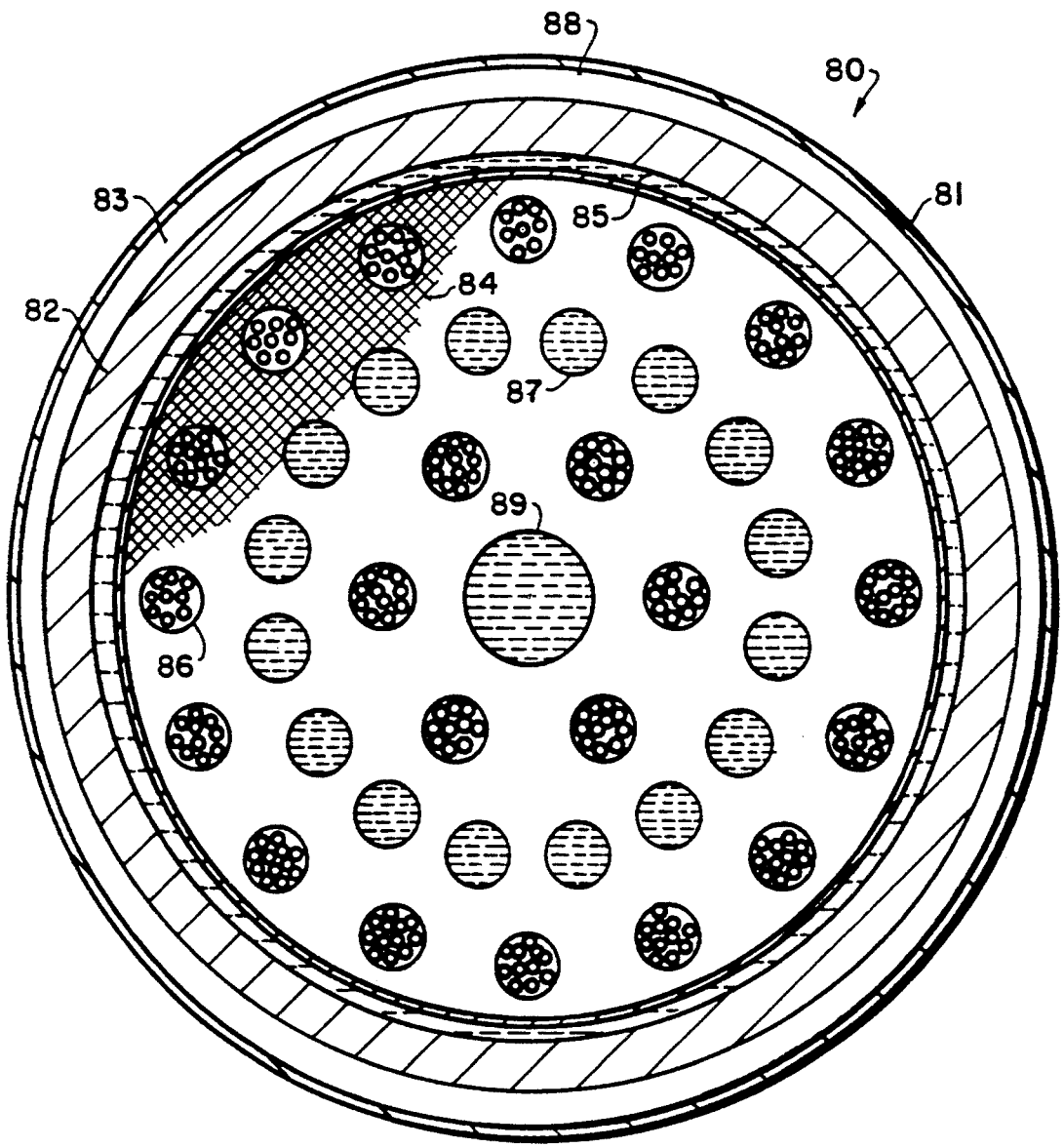
FIG. 6 is a sectional view of the fuel channel design of FIG. 5.
Figure 7:
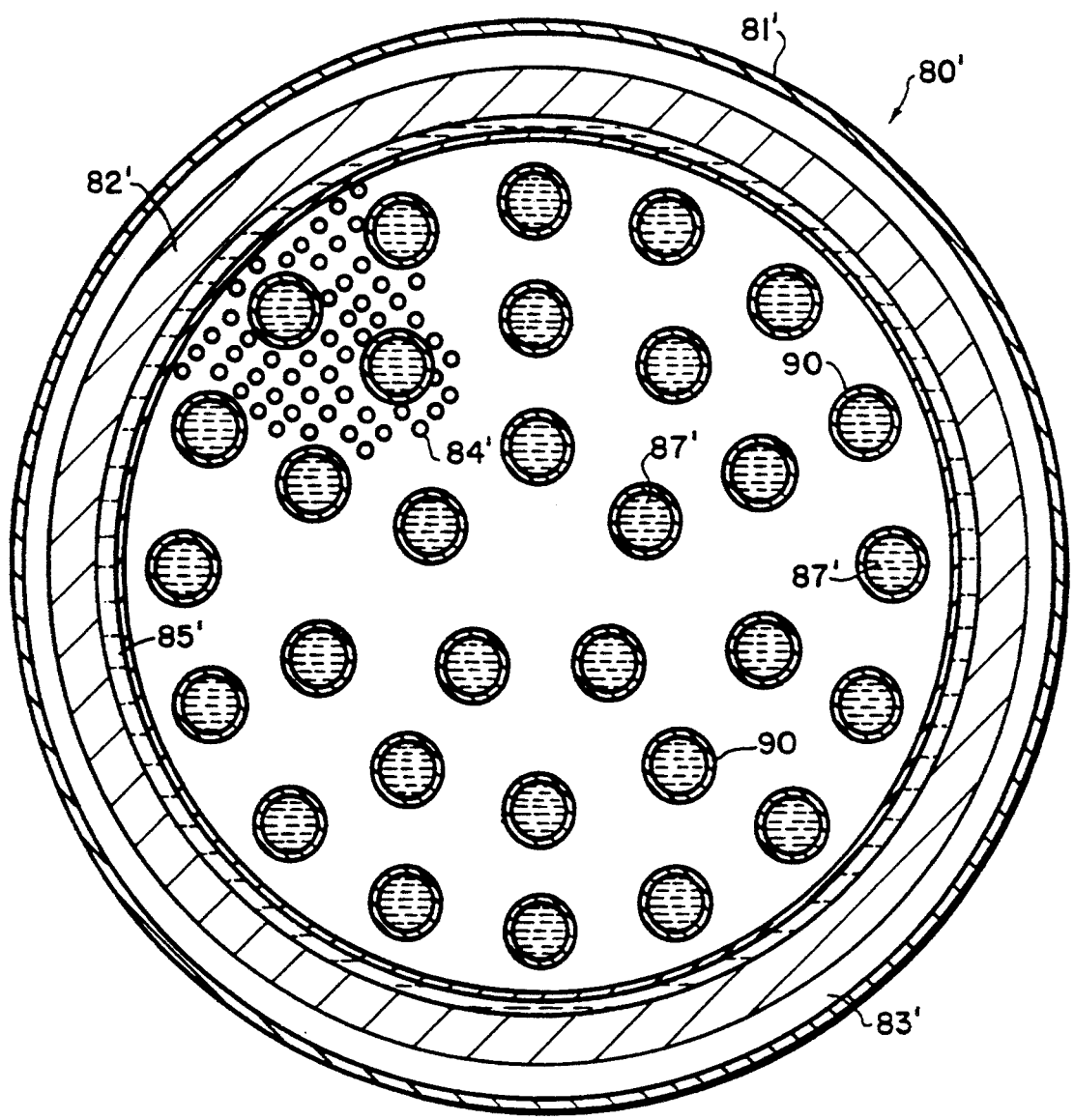
FIG. 7 is a sectional view of an alternative fuel channel design.

In order to enable the fuel matrix in the pressure tubes in the calandria to store excess energy while the calandria is being flooded and enhance the heat removal rate from the fuel to the pressure tube boundary, improved designs are shown for the fuel matrix in FIGS. 6 and 7.

As shown in FIG. 6, the calandria design 80 includes a calandria tube 81 with an inner pressure tube 82 forming a gap 83 therebetween filled with a high conductivity gas. Within the pressure tube 82 is fuel matrix 84 in the form of a solid cylindrical block and which forms a gap 85 between it and the pressure tube in which light water coolant flows. Within the fuel matrix 84 are a plurality of holes 86 filled with particle fuel in compacts. Also distributed between concentric layers of the particle fuel are holes 87 in which light water coolant flows. The design of FIG. 6 also includes a central hole 89 through which light water coolant flows.

In an alternative embodiment of the design 80' shown in FIG. 7, pressure tube 81' forms a gap 83' for high conductivity gas with pressure tube 82'. The solid fuel matrix with dispersed coated particle fuel 84' forms a gap 85' with the pressure tube and in which the light water coolant flows. Within the solid cylindrical block 84' are a plurality of holes 87' coated with a protective coating 90 and in which light water coolant flows.

The matrix materials are preferably materials with good thermal conductivity and high specific heat, relatively low neutron absorption cross-section, high resistance to radiation damage and good water and steam compatibility at high pressures. Graphite, silicon carbide and aluminum oxide are usable as matrix material. The fuel coated particle is similar to that employed in conventional designs and which can withstand high temperature. The kernels of the particles are uranium enriched to several per cent in the form of uranium oxide or preferably uranium carbide.

The separated coolant and fuel holes are distributed homogeneously inside the matrix material and the designs shown in FIGS. 6 and 7 are representative examples of distribution patterns.

It is to be appreciated by those of skill in the art that various arrangements of coolant and fuel holes may be placed within the envelope of a pressure tube and that the arrangement is not limited to the separated coolant and fuel holes.

It is also noted that the embodiment of FIG. 7 wherein a homogenous dispersion of the coated particle fuel within the solid block equipped with homogeneously distributed coolant holes which are protected by a high temperature and wear-resistant coating and also have other arrangements within the scope of the present invention.

The advantages of the fuel matrix design of the present invention is that it provides the feature of passive decay heat removal even in the absence of emergency coolant, it enables utilization of the high burn-up capabilities of particle fuel in a light water cooled reactor, it eliminates the problems of pellet cladding interaction existent with conventional pressure tube fuel, it enhances the prevention of fission gas released due to the multiple barriers of the fuel design such as the coating layers, matrix material and pressure tubes and the low density of the heavy metal per pressure tube combined with a dry calandria design increases prompt neutron lifetime and reduces greatly the potential concerns with reactor runaway.

Figure 8:
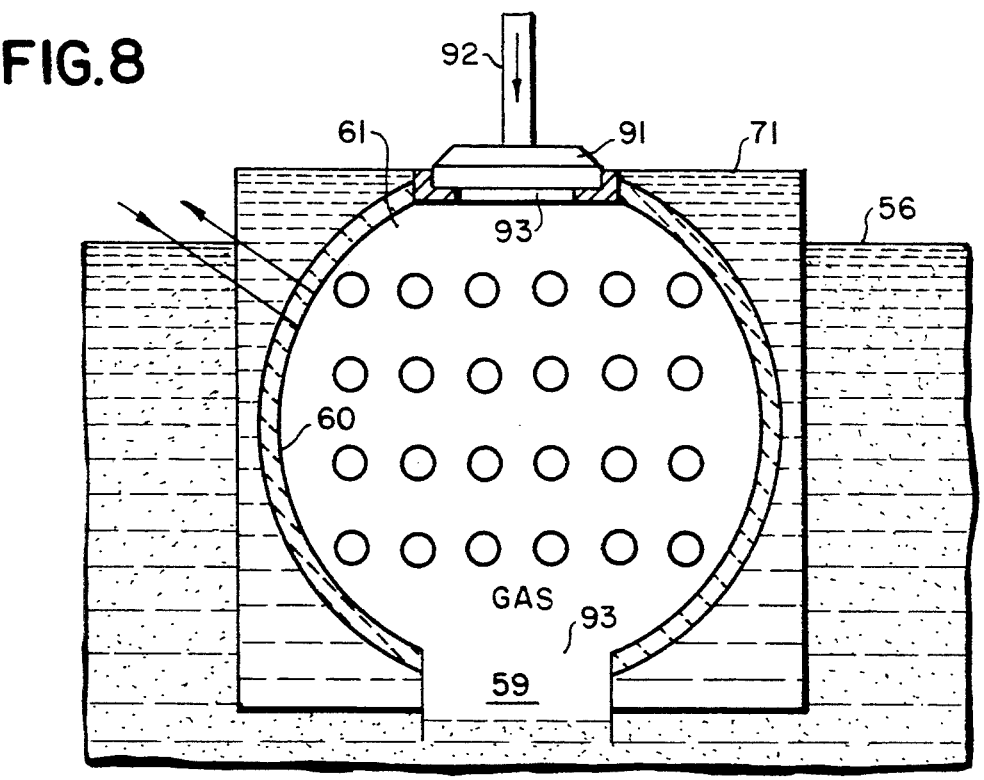
FIG. 8 shows the normal operation of the calandria of FIG. 5.
Figure 9:
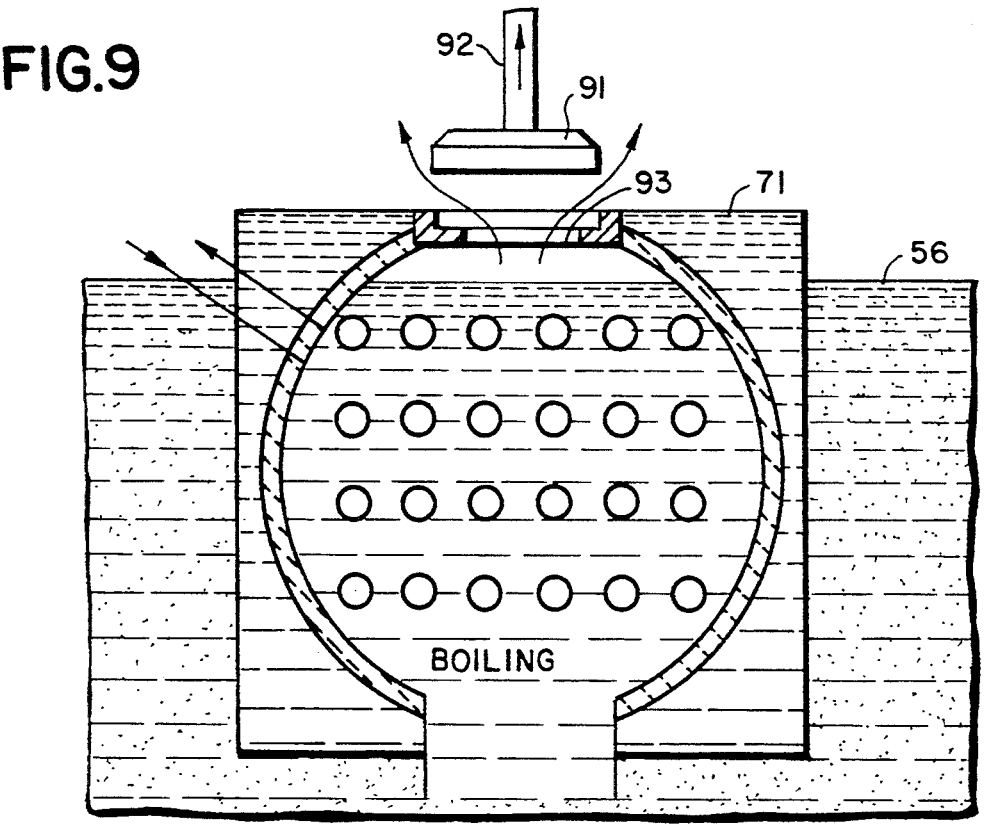
FIG. 9 shows the operation of the calandria of FIG. 5 after an accident.

FIGS. 8 and 9 show in more detail the operation of the gas lock according to the present invention.

As shown therein, the dry calandria design comprises the low pressure vessel 71 with the pressure tubes in a conventional arrangement. However, in the present invention, the heavy water moderator is replaced by gas under pressure which is slightly above atmospheric pressure to create a void space as shown in FIG. 8. The void space provides a gas lock for the containment water 56 which is in direct communication with the calandria space 61 and it increases the neutron migration length and lifetime and thus creates an environment for a core with a super flat profile of neutron thermal flux and hence power density.

The gas used for the gas lock should be non-corrosive, have low neutron absorption cross-section and should be stable in neutron flux and in a high temperature environment. Helium and carbon dioxide are each useful for this function.

As shown in FIGS. 8 and 9, the calandria bottom is equipped with large passages 93 with extended vertical walls submerged in the containment water 56. During normal operation, the containment water level is kept below the calandria bottom in the space within the extended vertical walls by maintaining the gas pressure in balance with the containment water column. The pressure level is maintained by the DC powered blower 69 and the control valve 68 shown in FIG. 5. The top of the calandria comprises several orifices 93 of appreciable size, hermetically closed by sealing members 91 during normal operation. The sealing member is connected to the piston 92 of a passive fail safe valve 70 which opens the sealing member due to disturbances in primary system pressure exceeding the envelope of safety limits, allowing rapid decrease of gas pressure and the flooding of the calandria.

It is appreciated that other devices for effecting calandria flooding can also be used, for example, an electrically powered blower connected by a pipe to the calandria space and maintaining the gas pressure while operating and otherwise releasing the pressure would also suffice.

Calandria flooding has the advantage of shutting down the reactor and rendering it deeply subcritical by excessive neutron absorption even in a boiling mode, providing a large amount of water which stores a large amount of decay energy in the form of latent heat and thus substantially reducing the instantaneous heat rate which must be transported through the containment walls in the early stages of an accident, insures the removal of decay heat from calandria tubes by boiling and condensing on containment walls and considerably reduces the decay heat load on the fuel matrix by absorbing a significant portion of the gamma heating which would have otherwise been deposited in the fuel matrix.

The reflector 60 which surrounds the calandria space has the properties of having very good reflecting power for both fast and thermal neutrons, very low neutron absorption cross-section and good resistance towards irradiation damage. Preferable materials for the reflector are graphite and beryllium with graphite being more preferable due to its lower cost and lower radiation damage.

In connection with this design, the calandria tube design shown in FIGS. 6 and 7 is particularly useful. The designs shown in FIGS. 6 and 7 have the primary function to protect the pressure tubes from excessive stresses which would have resulted had the cold water, during flooding, come into contact with a hot pressure tube still under pressure. The space between the calandria tube and the pressure tube is filled with high conductivity gas to maximize heat transport capabilities of the gap. The gas serves additionally for monitoring any leakage from the pressure tube. This can also be accomplished by use of duplex tubes.

Reactor control is accomplished by control rods containing neutron absorbers, inserted preferably in the solid reflector on both faces of the dry calandria in the space between the columns of pressure tubes.

This design eliminates the use of heavy water and substantially decreases heat losses during normal operations. The design also provides for an exceedingly flat profile of the neutron thermal flux and hence a flat power density profile in both axial and radial directions. This decreases the peaking factor by a factor of 2 compared with conventional thermal reactors.

Figure 10:
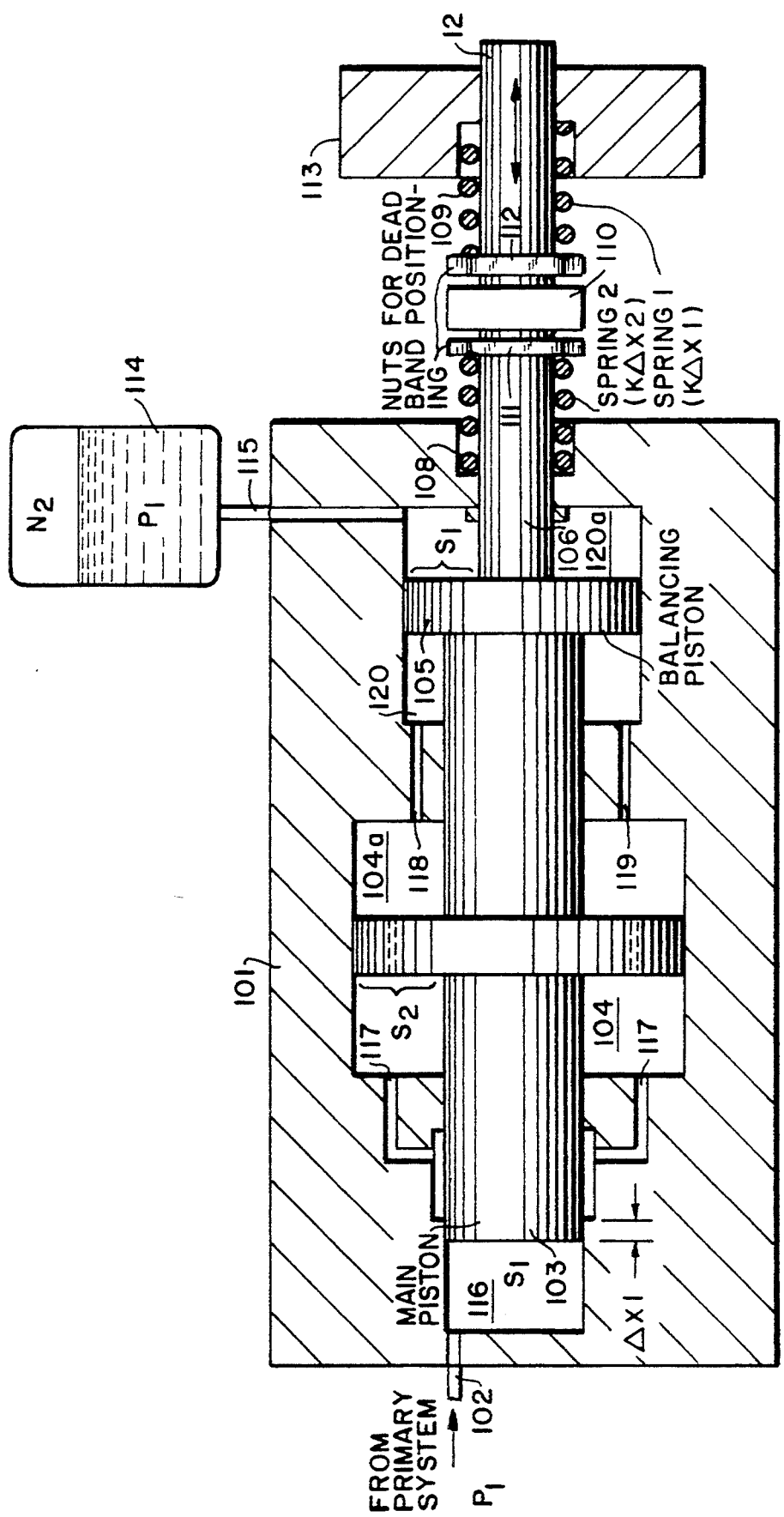
FIG. 10 is a sectional view of one portion of a passive fail safe fluid operated valve shown in FIG. 5.
Figure 11:
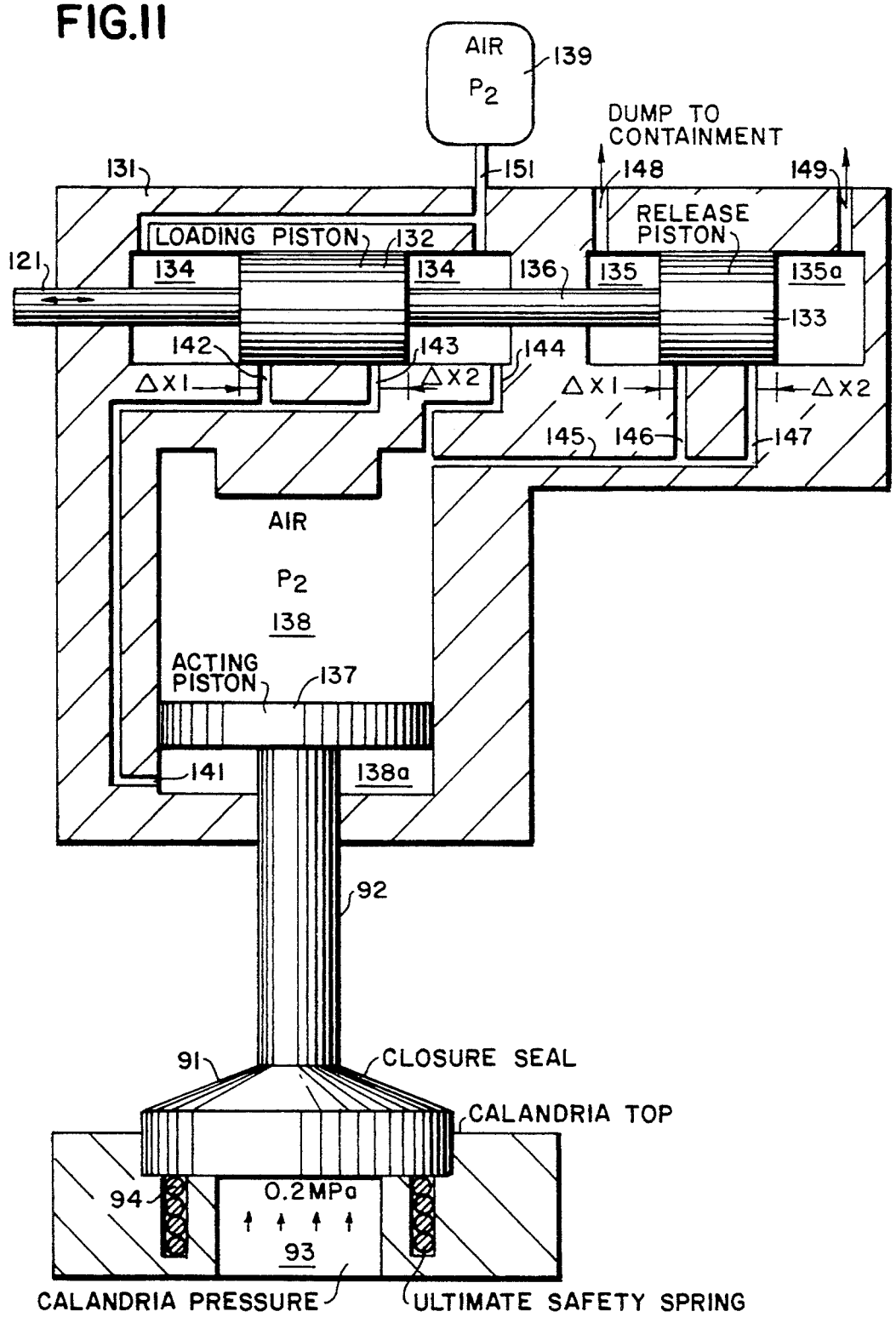
FIG. 11 is a sectional view of another portion of the fail safe fluid operated valve of FIG. 5.

FIGS. 10 and 11 show one embodiment of the fail safe valve 70 of FIG. 5 which consists of a pilot valve shown in FIG. 10 and an air operated main valve shown in FIG. 11 which are preferably connected in one body (not shown).

The pilot valve includes main piston 103, balancing piston 105, dead band positioning means including springs 108, 109, nuts 111, 112 and a nitrogen pressurized balancing tank 114. The air operated main valve comprises an air pressurized tank 139 of pressure P2 which is much lower than pressure P1 from the nitrogen tank 114, a loading piston 132, a release piston 133 on the same shaft 136 and sharing a common shaft 121 with that of the pilot valve, and an acting piston 137 connected to the shaft 92 which in turn is connected to the sealing member 91. The sealing member 91 is also biased upwardly by safety spring 94 shown in FIG. 11.

The valve works on primary system pressure P1 which is input via inlet 102 to chamber 116 of main piston 103. The dead bands are set such that envelop all conceivable pressure disturbances and transients which do not require reactor shutdown.

As shown in FIG. 10, the area 104a is connected to chamber 120 via fluid passages 118, 119 and nitrogen tank 114 is connected to area 120a on the other side of balancing piston 105.

In the main valve, air tank 139 communicates with space 134a and space 134 via passage 151. Chamber 135 communicates with the atmosphere via passage 148 and space 135a communicates with the atmosphere via passage 149.

Space 134 is also connectable to space 138a via passage 141 and 142 and space 134a communicates with space 138 via passage 144 and can communicate with space 138a via passage 141 and passage 143 when the load piston 132 is moved to the left. Space 138 communicates with space 135 through passages 145 and 146 when release piston 133 is moved to the right and communicates with space 135a via passages 145 and 147 when release piston 133 is moved to the left.

In case of a low pressure accident, that is, loss of coolant, the primary system pressure decrease leads to the movement of pistons to the left due to the difference between the force exerted by pressure in the balancing tank 114 and the force from the primary system pressure at inlet 102. This movement is opposed by spring 108 and continues without any action until the distance traveled by the pistons 103 and 105 equals $\Delta X_2$. At this point the lower pressure limit is reached, the loading piston 132 of the air operated valve switches the air passages such that the air pressure is released from the space 138 above the acting piston 137 and introduced below the acting piston and hence the acting piston moves upwardly and opens the closure element 91.

In the case of a high pressure accident such as the loss of a heat sink, the primary system pressure acting on the main piston 103 moves the pistons 103 and 105 to the right until the upper limit proportional to force $K\Delta X_1$, exerted by spring 109 is reached. At this point, the passage 117 around the main piston is opened allowing primary system pressure into area 104 and act on area $S_2$. The resulting force to the right is increased since it becomes proportional to area $S_2$ and moves the pistons to the right. This leads to reswitching of air passages and opening of the closure seal in the same manner as the case for low pressure discussed above.

The safety spring 94 is intended for the liftup of the closure seal in case of a failure of the air tank 139, although the pressure within the calandria will also act to open the sealing member.

As a result of the above-described design, all conceivable failures of the various valve parts lead to valve opening including a break in the pressure junction from the primary system, a break in the pressure junction from the nitrogen pressurized tank or break in the tank itself, a break in spring 108 or 109, a break of the air tank 139 or the low pressure junction to the air tank, failure of the safety spring 94 or all of the above failures combined.

Table I attached is a listing of parameters for preferred embodiments of wet and dry calandria reactors according to the present invention as described hereinabove.

The preceding specification describes, by way of illustration and not of limitation, preferred embodiments of the invention. Equivalent variations of the described embodiments will occur to those skilled in the art. Such variations, modifications, and equivalents are within the scope of the invention as recited with greater particularity in the following claims, when interpreted to obtain the benefits of all equivalents to which the invention is fairly entitled.

TABLE I

PARAMETERS FOR BOTH WET AND DRY CALANDRIA REACTORS (EXCEPT WHERE NOTED)

| Reactor System | | | |
|---|---|---|---|
| Core thermal Power | MWth | 4029 | |
| Moderator, Coolant | | $H_2O$, $H_2O$ | |
| No. of fuel channels | | 740 | |
| Core/calandria diameter | cm | 877.32 | |
| Core/calandria length | cm | 594 | |
| Channel pitch | cm | 28.575 | |
| Void Coefficient | | Negative | |
| Calandria Tube | | | |
| Outside diameter | mm | 222.62 | (148.62)* |
| Inside diameter | mm | 219.58 | (145.58)* |
| Tube thickness | mm | 1.52 | |
| Tube material | | Zr 2 | |
| Gas gap thickness | mm | 40 | (3)* |
| Pressure Tube | | | |
| Outside diameter | mm | 139.58 | |
| Inside diameter | mm | 128 | |
| Tube thickness | mm | 5.79 | |
| Channel length | mm | 5940 | |
| Tube material | | Zr-2.5Nb | |
| Fuel | | | |
| Diameter of the matrix | mm | 125.6 | |
| No. of pins per bundle | | 24 | |
| Rod diameter | mm | 12.7 | |
| Clad thickness | mm | 0.419 | (N.A.)* |
| Pellet diameter | mm | 11.774 | (N.A.)* |
| No. of lands (per rod) | | 4 | (N.A.)* |
| Thickness of lands | mm | 1.0 | (N.A.)* |
| Enrichment | % | 2 | (7)* |
| Refueling | | on-load | |
| Burnup, MWd/MT | | −18,800 | (80,000)* |
| Primary System | | | |
| Pressure (channel in,out) | MPa | 15.34, 14.0 | (15.0, 14.3)* |
| Channel $\Delta P$ | MPa | 1.06 | (0.7)* |
| Temp. (channel in,out) | C | 298.9, 338.3 | |
| Channel $\Delta T$ | C | 39.4 | |
| Outlet quality | % | 1.34 | (0.5)* |

TABLE I-continued

| PARAMETERS FOR BOTH WET AND DRY CALANDRIA REACTORS (EXCEPT WHERE NOTED) | | | |
|---|---|---|---|
| Mass flow rate/Core Moderator System | Mg/s | 15.51 | |
| Temp. (in.out) | C | 55.98 | (N.A.)* |

*Dry Calandria Reactor - N.A. — Not Applicable

What is claimed is:

1. A fuel channel for a nuclear reactor comprising: a solid fuel matrix having a plurality of coolant holes extending longitudinally therethrough and receptive of light water coolant, a pressure tube surrounding the fuel matrix and a calandria tube surrounding the pressure tube and forming a gap therebetween.

2. The fuel channel according to claim 1, further comprising a thermal switch in the gap between the pressure tube and the calandria tube.

3. The fuel channel according to claim 2, wherein the thermal switch comprises axial fins alternately attached to an inner surface of the calandria tube and an outer surface of the pressure tube.

4. The fuel channel according to claim 2, further comprising a moderator tube surrounding the calandria tube and forming a moderator channel therebetween receptive of moderator fluid.

5. The fuel channel according to claim 1, wherein the fuel matrix has coated particle fuel dispersed therein and wherein the coolant holes have a protective coating on the walls thereof.

6. In a nuclear reactor having a containment vessel and means forming a calandria space having a plurality of fuel channels therein, the improvement comprising means forming a gas-filled chamber surrounding the calandria space and a solid reflector in the chamber surrounding the calandria space.

7. The nuclear reactor defined in claim 6 further comprising a light water pool arranged outside the chamber in readiness for flooding the calandria space as an emergency coolant.

8. The nuclear reactor defined in claim 7, wherein the light water pool surrounds the chamber.

9. The nuclear reactor according to claim 7, further comprising means forming a gas lock in the calandria space to prevent the light water from entering the calandria space.

10. The nuclear reactor according to claim 9, wherein the means forming the gas lock comprises self-actuating means for releasing the gas pressure in the gas lock to flood the calandria space.

11. The nuclear reactor according to claim 10, wherein the self-activating means comprises a valve responsive to a drop or an increase in system pressure.

12. The nuclear reactor according to claim 6, wherein each fuel channel comprises a solid fuel matrix having a plurality of coolant holes extending longitudinally therethrough and receptive of light water, a pressure tube surrounding the fuel matrix and a calandria tube surrounding the pressure and forming a gap therebetween.

13. The nuclear reactor according to claim 12, further comprising a thermal switch in the gap between the pressure tube and the calandria tube.

14. The nuclear reactor according to claim 13, wherein the thermal switch comprises axial fins alternately attached to an inner surface of the calandria tube and an outer surface of the pressure tube.

15. The nuclear reactor according to claim 13, further comprising a moderator tube surrounding the calandria tube and forming a moderator channel therebetween receptive of light water.

16. A fuel channel for a nuclear reactor according to claim 9, wherein a solid fuel matrix having a plurality of coolant holes extending longitudinally therethrough and receptive of light water coolant, a pressure tube surrounding the fuel matrix and a calandria tube surrounding the pressure tube and forming a gap therebetween.

17. The nuclear reactor according to claim 16, wherein the fuel matrix has coated particle fuel dispersed therein and wherein the coolant holes have a protective coating on the walls thereof.

* * * * *